US008613088B2

(12) United States Patent
Varghese et al.

(10) Patent No.: US 8,613,088 B2
(45) Date of Patent: Dec. 17, 2013

(54) METHODS AND SYSTEMS TO DETECT AN EVASION ATTACK

(75) Inventors: George Varghese, Sunnyvale, CA (US); Flavio Giovanni Bonomi, Palo Alto, CA (US); John Andrew Fingerhut, Mission Viego, CA (US)

(73) Assignee: Cisco Technology, Inc., San Jose, CA (US)

( * ) Notice: Subject to any disclaimer, the term of this patent is extended or adjusted under 35 U.S.C. 154(b) by 1200 days.

(21) Appl. No.: 11/552,025

(22) Filed: Oct. 23, 2006

(65) Prior Publication Data

US 2007/0192861 A1 Aug. 16, 2007

Related U.S. Application Data

(60) Provisional application No. 60/764,818, filed on Feb. 3, 2006.

(51) Int. Cl.
*G06F 12/14* (2006.01)

(52) U.S. Cl.
USPC ........... 726/23; 726/24; 726/25; 713/188; 713/189; 709/223; 709/224

(58) Field of Classification Search
USPC .............................. 709/224–225, 230–232
See application file for complete search history.

(56) References Cited

U.S. PATENT DOCUMENTS

| 5,586,266 | A  | * | 12/1996 | Hershey et al. | 702/182 |
| 6,279,113 | B1 | * | 8/2001  | Vaidya         | 726/23  |
| 6,880,087 | B1 | * | 4/2005  | Carter         | 726/23  |
| 7,802,303 | B1 | * | 9/2010  | Zhao et al.    | 726/24  |
| 2003/0084322 | A1 | * | 5/2003 | Schertz et al. | 713/200 |
| 2003/0145225 | A1 | * | 7/2003 | Bruton et al.  | 713/201 |
| 2004/0093513 | A1 | * | 5/2004 | Cantrell et al.| 713/201 |
| 2004/0250124 | A1 | * | 12/2004 | Chesla et al.  | 713/201 |
| 2005/0216770 | A1 | * | 9/2005 | Rowett et al.  | 713/201 |
| 2005/0229254 | A1 | * | 10/2005 | Singh et al.   | 726/23  |
| 2006/0077979 | A1 | * | 4/2006 | Dubrovsky et al.| 370/394 |
| 2006/0174345 | A1 | * | 8/2006 | Flanagan et al.| 726/24  |
| 2007/0044142 | A1 | * | 2/2007 | Yoon et al.    | 726/3   |

* cited by examiner

*Primary Examiner* — Andrew L Nalven
*Assistant Examiner* — Amir Mehrmanesh
(74) *Attorney, Agent, or Firm* — Schwegman Lundberg & Woessner, P.A.

(57) ABSTRACT

A method and system to detect an evasion attack are provided. The system may include a repository to store signature fragments that together constitute an attack signature, an interceptor to intercept a data packet associated with a network connection, a string-matching module to determine whether the payload of the data packet includes any of the stored signature fragments thereby identifying a match, a responder to perform a prevention action in response to the match, and a detector to detect that a size of the data packet is less than a size threshold. The system may further include a state machine to commence maintaining a state for the network connection in response to the detector determining that the size of the data packet is less than the size threshold.

18 Claims, 5 Drawing Sheets

METHODS AND SYSTEMS TO DETECT AN EVASION ATTACK

RELATED APPLICATIONS

This patent application claims the benefit of priority, under 35 U.S.C. Section 119(e), to U.S. Provisional Patent Application Ser. No. 60/764,818, filed on Feb. 3, 2006, the entire content of which is incorporated herein by reference.

TECHNICAL FIELD

This application relates to methods and systems to detect an evasion attack on a network.

BACKGROUND

An intrusion detection system (IDS) is typically used for the purpose of detecting unwanted manipulations of computer systems. Such unwanted manipulations may take the form of malicious network traffic and computer usage that cannot be detected by a conventional firewall. Some examples of unwanted manipulations include network attacks against vulnerable services, data-driven attacks on applications, host-based attacks such as privilege escalation, unauthorized logins and access to sensitive files, and so-called malware (viruses, Trojan horses, and worms).

One of the obstacles that may be encountered when attempting to perform high-speed intrusion detection is a problem associated with the need to detect an attack signature that may be split across several data packets. In order to detect such attacks, some existing systems require transmission control protocol (TCP) reassembly and/or normalization, which, in turn, may require storing of a significant amount of per-TCP-connection state in order to identify attack signatures that may be split across multiple data packets. Furthermore, as a server may be capable of maintaining as many as one million connections, and as an average of 100 bytes or more may need to be stored for each connection, the total memory requirement for such an intrusion detection system may create a need for an off-chip dynamic random access memory (DRAM) and a processor complex, which may be less than desirable.

BRIEF DESCRIPTION OF DRAWINGS

Embodiments of the present invention are illustrated by way of example and not of limitation in the figures of the accompanying drawings, in which like reference numbers indicate similar elements and in which.

DETAILED DESCRIPTION

Figure 1:
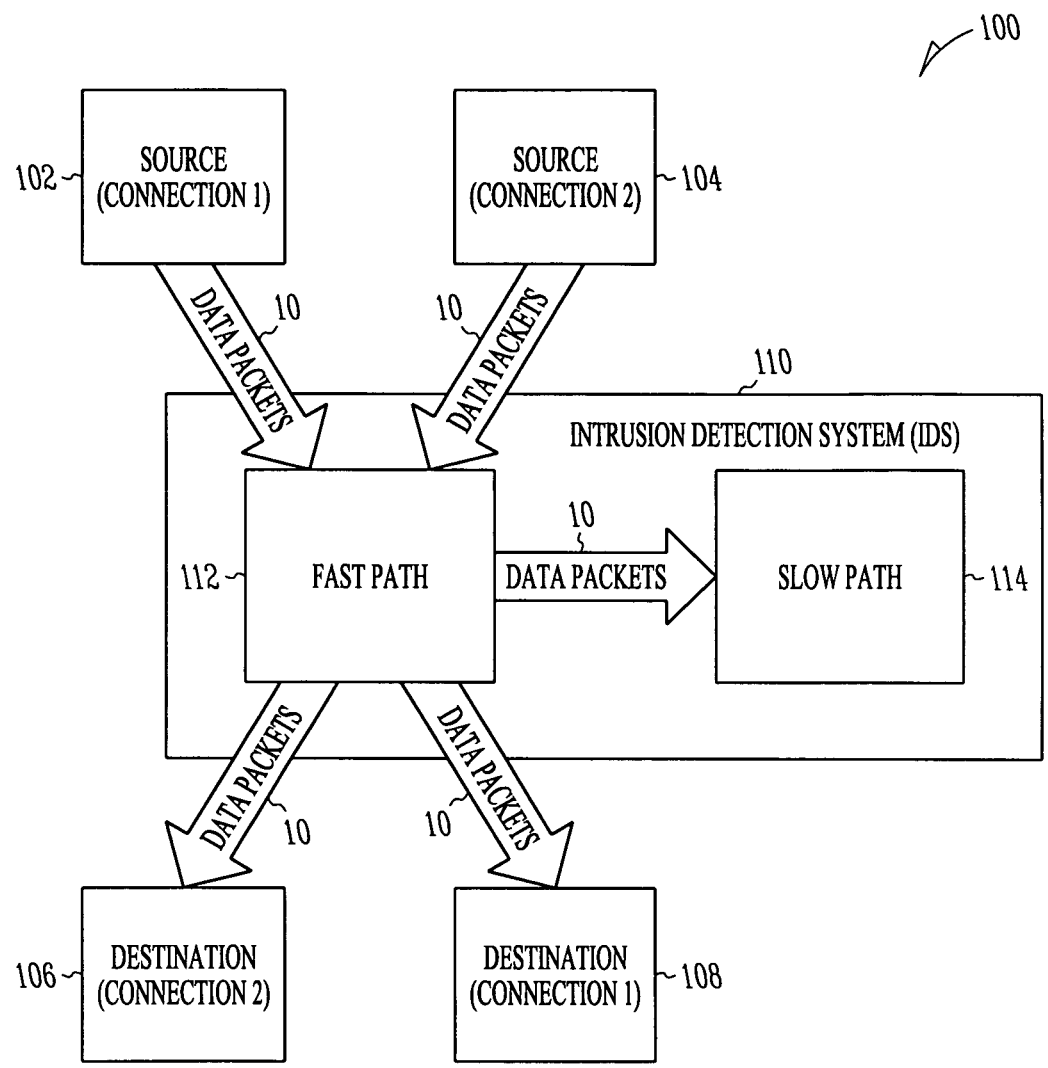
FIG. 1 shows a network environment within which an example embodiment may be implemented.

Methods and systems are provided to find, within a network device, occurrences of a configured set of attack signatures within data streams (e.g., TCP data streams) without requiring all TCP connections to be reassembled. For the purposes of this description, an "attack signature" will be understood as meaning an exact string that may occur within a data stream as reassembled at the destination host. For example, an intrusion detection system (IDS) may be configured to detect any occurrence of the string "I_AM_AN_EXPLOIT_FOR_A_COMMON_SERVER_BUG" within TCP streams passing through the detection system's network, even if this string is being split across multiple TCP packets.

An IDS may be designed to have a fast path portion and a slow path portion. A fast path may be configured to detect certain occurrences of an attack signature on its own but to utilize the functionalities of the slow path when necessary. The slow path, in an example embodiment, may have greater processing capabilities than the fast path and may be configured to reassemble a TCP data stream to detect any attack that may not necessarily be detected by the fast path.

In an example embodiment, a signature of an attack is first split into a plurality of fragments that may be of equal size. The fast path may monitor a TCP connection to determine whether any of the data packets that have been intercepted by an IDS contain any of the attack signature fragments. If the fast path encounters a data packet that cannot include an entire fragment of the attack signature, such packet is identified by the fast path as suspicious or potentially indicative of an attack. A data packet having a size that is not sufficient to store any of the predetermined attack signature fragments will be referred to as a small packet, for the purposes of this description. Thus, a threshold for determining whether any given data packet is a small packet relates to the size of the predetermined attack signature fragments.

Upon detecting a small packet, the fast path, in one example embodiment, starts maintaining the state for the associated connection, (e.g., utilizing a hash table implementation). The fast path may also start a counter of anomalies detected for the connection. In one example embodiment, the counter of anomalies may be incremented when two closely spaces small packets are detected or when an out-of-order packet is detected between any two small packets.

When the number of the detected anomalies for a particular connection reaches a predefined threshold, all subsequent packets for such connection may be diverted to the slow path for more detailed analysis. An anomaly that causes the incrementing of a counter may be referred to as a "strike" against the associated network connection.

Thus, in an example embodiment, an IDS does not need to maintain the state for a connection unless a packet that is smaller than a predetermined threshold size is detected. Furthermore, some occurrences of an attack signature may be detected by the fast path without the need to reassemble the TCP data stream and, consequently, without the need to engage the slow path.

Because the techniques described herein may include first splitting an attack signature into a plurality of fragments and then monitoring the data stream for any of the fragments, an example technique may be referred to as a "split-detect method". On the other hand, an intrusion detection system that is configured to utilize such a technique may be termed a "split-detect system". An example embodiment of a split-detect system may be implemented in the context of a network environment. An example of such a network is illustrated in FIG. 1.

FIG. 1 shows a network environment 100 within which an example embodiment may be implemented. The environment 100, in an example embodiment, includes a plurality of source systems, such as a source system 102 and a source system 104, and a plurality of destination systems, such as a destination system 106 and a destination system 108, coupled to a communications network. The communications network may be a public network (e.g., the Internet, a wireless network, etc.) or a private network (e.g., local area network (LAN), wide area network (WAN), Intranet, etc.). Bridging the source systems 102 and 104 and the destination systems 106 and 108, there is disposed an IDS 110. The IDS 110 may also be referred to as a split-detect system.

As shown in FIG. 1, the IDS 110 receives (or intercepts) data packets 10 from one or more sources, such as the source system 102 and the source system 104. The received data packets are examined at the IDS 110 and, if no indication of an attack is detected, the data packets 10 are forwarded to their respective destinations, e.g., the destination system 106 or the destination system 108. In an example embodiment, the source system 102 and the destination system 108 may be associated with a TCP connection 1, and the source system 104 and the destination system 106 may be associated with a TCP connection 2.

The IDS 110, in an example embodiment, includes a fast path 112 and a slow path 114. As mentioned above, the fast path 112 may be configured to detect some occurrences of attack signatures without engaging the slow path 114. Specifically, in accordance with an example embodiment, the fast path 112 may be capable of detecting those attacks, for which at least a configurable minimum number of bytes (M) of the attack signature lies completely in the payload of one TCP packet.

In an example embodiment, the IDS 110 may store each attack signature from a plurality of attack signatures in the form of a plurality of signature fragments. The fast path 112 may scan the TCP payload to detect whether the payload comprises any of the stored signature fragments. As long as no small packets are present in the data stream associated with a given TCP connection, the fast path 112 does not maintain any per-connection state for such connection. It will be noted that, in an example embodiment, detecting a data packet that has a payload of zero size (e.g., an acknowledgement (ACK) packet with no data) does not trigger the state to be maintained, nor does it trigger any protective action.

If the fast path 112 receives any TCP packets, for which the fast path 112 may not be able to detect an occurrence of an attack signature by itself, the fast path 112 may operate as follows. If the fast path 112 is suspicious of a TCP connection, but it is impossible that the reconstructed TCP stream could contain an occurrence of the entire attack signature, the fast path 112 may forward the data packet normally to its destination, but also send a copy of the suspicious data packet to the slow path 114 for possible future use.

If, on the other hand, the fast path 112 determines that it is possible that the reconstructed TCP stream contains an occurrence of an entire attack signature and yet the fast path 112 is not capable of detecting the attack signature on its own (e.g., the IDS have detected a number of TCP packets that are too small to include any of the stored attack signature fragments), the fast path 112, instead of forwarding the data stream normally, redirects the data stream to the slow path 114 for more detailed analysis and, possibly for reassembly and normalization. The slow path 114, in an example embodiment, may utilize a variety of techniques to reconstruct TCP data streams from the individual packets in order to find occurrences of attack signatures. An example embodiment of an IDS is illustrated in FIG. 2.

Figure 2:
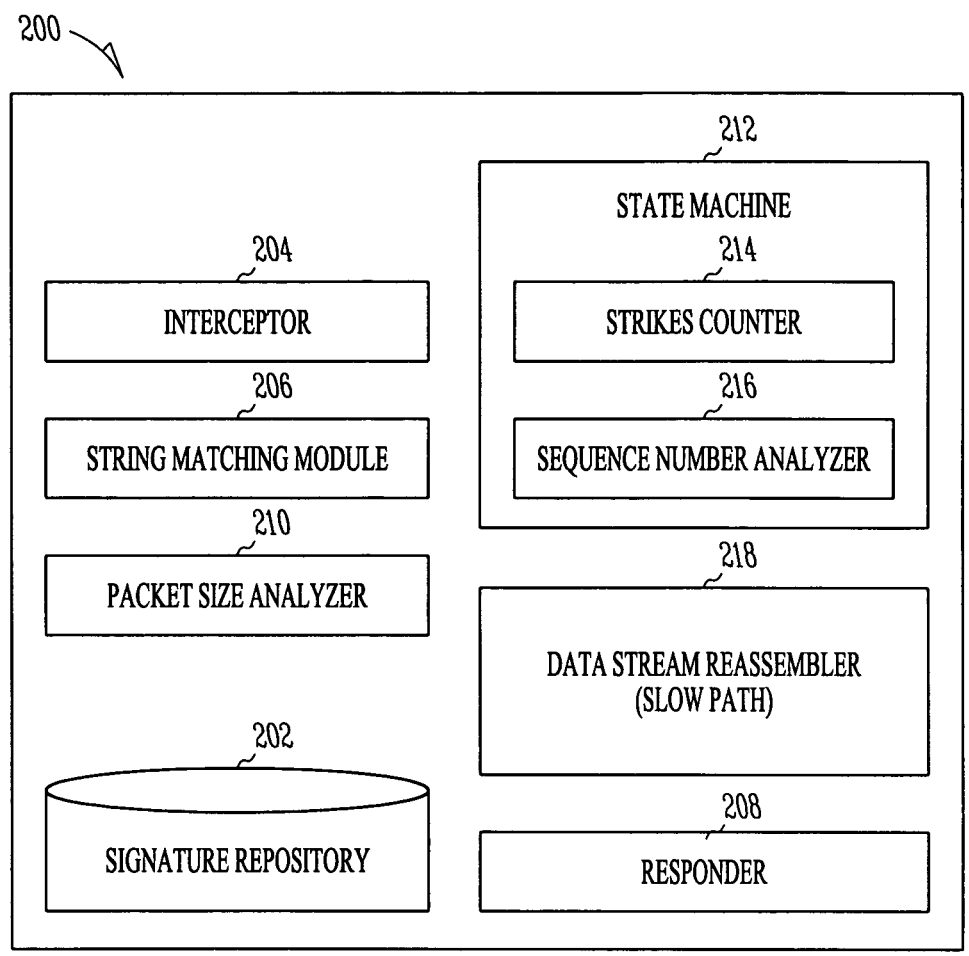
FIG. 2 is a block diagram of an intrusion detection system (IDS), in accordance with an example embodiment.

FIG. 2 shows a block diagram of an intrusion detection system (IDS) 200, in accordance with an example embodiment. As shown in FIG. 2, the IDS 200 comprises a signature repository 202 to store various identified attack strings. An attack string may be stored as the entire attack string, as well as a plurality of fragments that together make up the attack string. The IDS 200 may further comprise an interceptor 204 to receive/intercept data packets that are being transferred from a source system to a destination system, a string-matching module 206 to detect an occurrence of an attack string fragment in the payload of the intercepted data packet, and a responder 208 to request or perform a prevention action if an attack string fragment or a certain predetermined anomaly within the data stream is detected. A prevention action may, in an example embodiment, include dropping the data packet, thereby effectively dropping the entire connection, or redirecting the data packet or the entire associated data stream for further analysis (e.g., to the slow path 114 of FIG. 1). The interceptor 204, the string-matching module 206, the responder 208, and the packet size analyzer 210 may be considered as included in the fast path 112 of FIG. 1.

Also included in the fast path 112 of FIG. 1 may be a state machine 212 configured to maintain the state of a network connection. As mentioned above, the state for a connection is being maintained in response to detecting a small packet within the associated data stream. A small packet may be detected by the packet size analyzer 210. The state machine 212, in an example embodiment, may include a strikes counter 214 and a sequence number analyzer 216. The sequence number analyzer 216 may be configured to detect any data packet that has an out-of-order sequence number. The strikes counter 214 may be configured to keep track of the number of anomalies detected within a particular data stream and to provide, to the responder 208, any information needed to determine whether to divert any or all of the data packets associated with a particular connection to the slow path 114.

The slow path, in an example embodiment, comprises a data stream reassembler 218. The data stream reassembler 218 may be configured to process diverted data packets utilizing the full connection state, reassembly and normalization. It will be noted, that, in an example embodiment, the data stream reassembler 218 may reside on a device separate from a device hosting the modules associated with the fast path 112. For example, the modules associated with the fast path 112 (e.g., the interceptor, 204, the string-matching module 206 and the state machine 212) may be hosted on a first processor, while the data stream reassembler 218 may be hosted on a separate processor. In an example embodiment, the data stream reassembler 218 may cooperate with an additional module (not shown) provided with the slow path 114 to determine whether a packet received by the slow path 114 is a small packet.

As mentioned above, an IDS may be utilized to detect any unwanted manipulations of computer systems. An example method to detect an evasion attack on a network is described with reference to FIG. 3.

Figure 3:
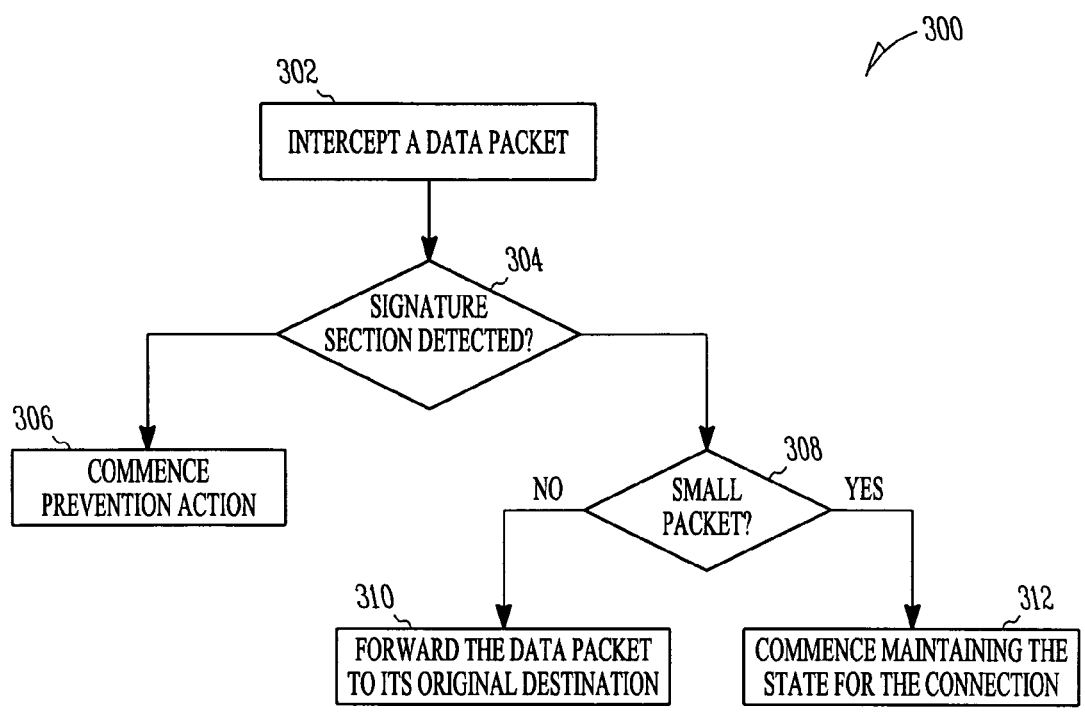
FIG. 3 is a flow diagram illustrating a method, in accordance with an example embodiment, to monitor data packets on a network.

FIG. 3 shows a method 300, in accordance with an example embodiment, to monitor data packets on a network. The method 300 may be performed by processing logic that may comprise hardware (e.g., dedicated logic, programmable logic, microcode, etc.), software (such as any type of code running on a general-purpose computer system or a dedicated machine), or a combination of both.

As shown in FIG. 3, the method 300 commences at operation 302, where the interceptor 202 receives a data packet associated with a TCP connection, for which a state is not being maintained. At operation 304, the string-matching module 206 determines whether one of the predetermined attack signature fragments is present in the intercepted data packet. If it is determined, at operation 304, that one of the predetermined attack signature fragments is present in the payload of the data packet, the responder 210 may perform a prevention action, such as diverting the packet to the reassembler 218 at operation 306. If it is determined, at operation 304, that the intercepted data packet does not contain any of the predetermined attack signature fragments and that the size of the packet is not small, according to a predetermined criteria (operation 308), the packet is forwarded to its destination at operation 310.

As discussed above, the fast path 112 may be capable of detecting the attack signatures without performing TCP reassembly as long as the subject data packets are of a size for which at least a configurable minimum number of bytes (M) of the attack signature lies completely in the payload of one data packet. Thus, if the packet size analyzer 210 determines, at operation 308, that the size of the intercepted data packet is less than the predetermined minimum number of bytes (M) of the attack signature (the packet is a small packet), the state machine 212 receives an instruction to start maintaining the state for the associated connection at operation 312.

After the state machine 212 starts maintaining the state for a particular connection, additional information may become available to the IDS 200 that may be utilized to determine that the intercepted data packets associated with the monitored connection are indicative of an attack.

In one example embodiment, the state machine 212 may be configured to monitor a connection and to identify the monitored connection as anomalous if a predetermined number of anomalous events (strikes) have been detected. According to one example embodiment, an event, where two small packets have been detected within a predetermined sequence length (e.g., a sequence length less than the maximum signature length) may be identified by the state machine 212 as an anomalous event. A sequence length between two packets may be determined by subtracting the sequence number of a first packet from the sequence number of the second packet.

Another example event that may be identified by the state machine 212 as anomalous, is where a small packet is detected that is preceded by at least one out-of-order packet, while the out-of-order packet, in turn, is preceded by another small packet. Thus, in one example embodiment, an innocuous connection that sends small packets that are sufficiently spaced apart is not diverted to the slow path. Furthermore, an innocuous connection that sends very few out-of-order small packets is not diverted.

Figure 4:
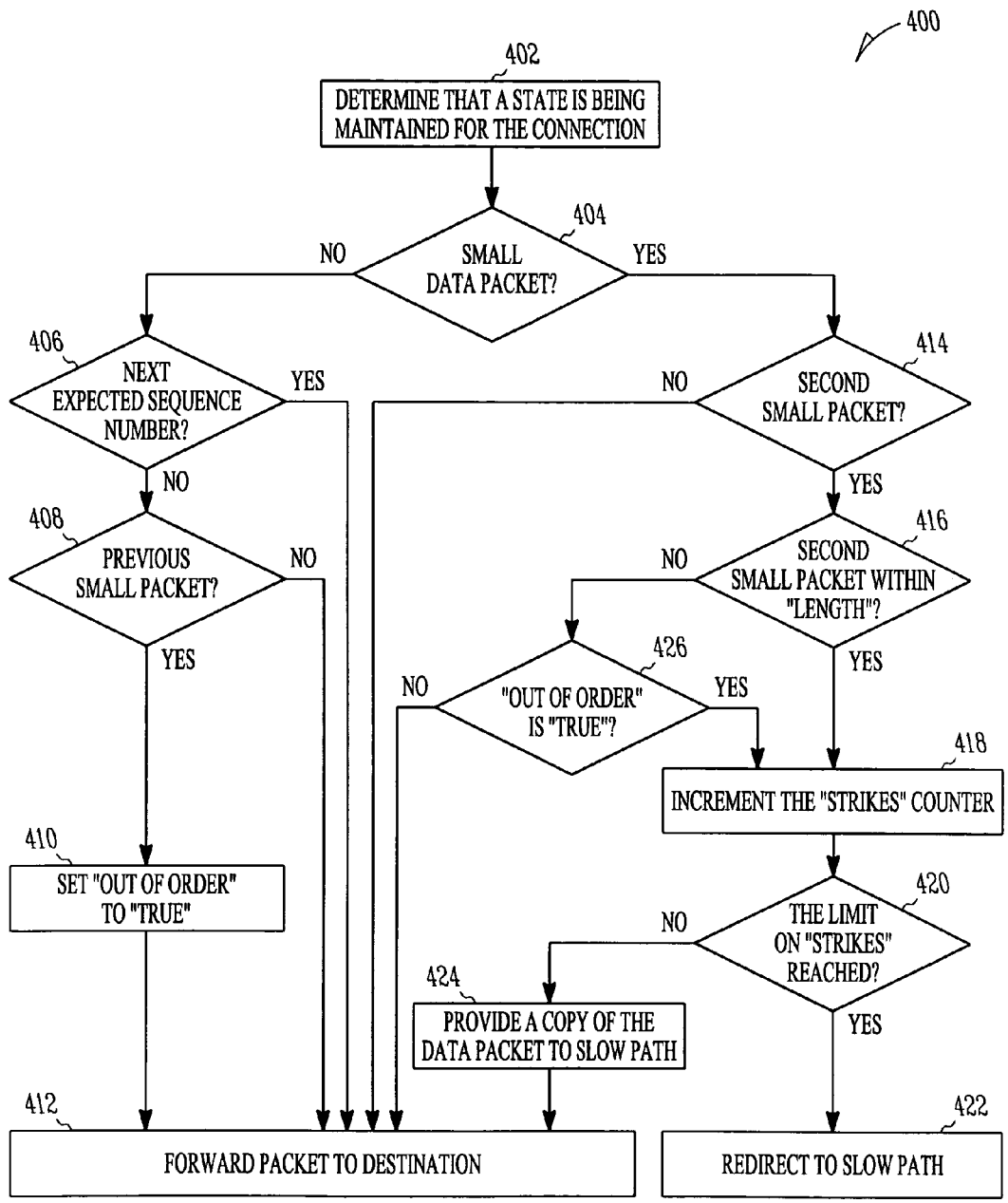
FIG. 4 is a flow diagram illustrating a method, in accordance with an example embodiment, to detect an indication of an attack signature.

FIG. 4 shows a method 400, in accordance with an example embodiment, to detect an indication of an attack signature. The method 400 may be utilized to determine that a connection, for which the state machine 212 is maintaining the state, includes an attack signature. The method 400 may be performed by processing logic that may comprise hardware (e.g., dedicated logic, programmable logic, microcode, etc.), software (such as any type of instructions running on a general purpose computer system or a dedicated machine), or a combination of both.

As shown in FIG. 4, the method 400 commences at operation 402, where it is determined that the state machine 212 already maintains the state for the connection associated with the intercepted data packet. If the data packet is not a small packet, (determined at operation 404), the sequence number analyzer 216 determines, at operation 406, whether the packet is an out-of-order packet (e.g., whether the sequence number associated with the packet is the next expected sequence number). If the packet is not an out-of order packet (e.g., the sequence number associated with the packet is the next expected sequence number), the packet is forwarded to it's destination at operation 412. If, however, the packet is determined to be an out-of-order packet (e.g., the sequence number associated with the packet is not the next expected sequence number), the state machine 212 determines, at operation 408, whether a small packet has already been detected within the monitored data stream.

As mentioned above, the state machine 212 may be configured to monitor for an out-of-order packet that is preceded by a small packet and followed by a small packet. Thus, a determination, at operation 408, that the subject data packet is an out-of order packet that is preceded by a small packet, triggers an operation of setting an "out-of-order" indicator, at operation 410, to indicate that the strikes counter 214 may be incremented next time a small packet is encountered. The packet is then forwarded to its destination at operation 412.

If it is determined, at operation 404, that the data packet is a small packet, the state machine 212 determines whether the subject data packet is the second small packet within a predetermined sequence length (operations 414 and 416). If the subject data packet is the second small packet within a predetermined sequence length, the strikes counter 214 increments the number of strikes for the monitored connection at operation 418 and the method 400 proceeds to operation 420. If it is determined, at operation 412, that the data packet is not a second small packet, the packet is then forwarded to its destination at operation 412.

If it is determined, at operation 412, that the data packet is a second small packet, but that the sequence length between the subject data packet and the first data packet is greater than a predetermined threshold (e.g., greater than the maximum attack signature length) the sequence number analyzer 216 determines whether the data packet is an out-of-order packet at operation 426. If the sequence number of the data packet is not out-of-order, the packet is then forwarded to its destination at operation 412. Otherwise, the strikes counter 214 increments the number of strikes against the associated connection at operation 428.

If the number of strikes against the monitored connection has reached a predetermined threshold, which is determined at operation 420, the data packet is not forwarded to its destination, but instead is redirected to the slow path at operation 422. Otherwise, the data packet is forwarded to its destination, while a copy of the data packet is provided to the slow path for further processing at operation 424.

It will be noted, that, although the embodiments are described herein with reference to TCP packets, the techniques described herein may be advantageously utilized with various other communications protocols.

An example implementation of a split-detect method utilizes the following configuration parameters. "Signature_length" parameter is the length in bytes of a particular attack signature. "Small_thresh" parameter is the maximum length of a "small" packet. "Count_thresh" parameter is the maximum number of "strikes" permitted for a connection before all of its remaining data packets are redirected to the slow path.

In an example embodiment, information maintained for each connection in the fast path's table is described below. A 32-bit sequence number expected to be associated with the next data packet may be expressed as an (exp_seq) value. The number of "strikes" against this flow may be expressed as a (count) value. The number of bytes seen in all packets since the last small packet was seen may be expressed as a (length_since_last_small_pkt) value. In an example embodiment, the length_since_last_small_pkt only needs to be in the range [0, signature_length+1]. A 1-bit Boolean value, indicating whether any of the out of-order packets (i.e. those with a sequence number not equal to the expected sequence number) have been seen since the last small packet was seen may be expressed as an (ooo_since_last_small_pkt) value. A value used for aging out old table entries, which are no longer being used, may be expressed as a (last_updated_time) value. This value can be a fairly "coarse" timer, e.g. 3 bits may be enough to provide fairly tight bounds on how long a table entry may be left unused before it is removed.

Below is an example pseudocode, illustrating a technique utilized by the fast path to determine for which connections to create a per-connection state, and to maintain that state after the state is created.

```
// Time_now is the current time at which the data packet is being
// processed, used for aging out old flow information. Not shown
// here is a background scanning task that deletes table entries that
// have not been updated for a predetermined period of time.
// Seq and tcp_payload_len are obtained from the received TCP packet
process_tcp_packet (int time_now,
    int small_thresh,
    int count_thresh,
    int signature_length,
    uint32 seq,
    uint16 tcp_payload_len)
{
    packet_action = FORWARD_NORMALLY;
    small_pkt = (tcp_payload_len <= small_thresh)
        && (tcp_payload_len != 0);
    if (packet is IP fragment) {
        packet_action = REDIRECT_TO_SLOW_PATH;
    } else {
        if (no state is currently being maintained for the flow) {
            if (small_pkt) {
                // Create a new TCP connection state for this
                // connection's 5-tuple, with the following initial
                // state:
                flow_info.exp_seq = seq + tcp_payload_len;
                flow_info.count = 0;
                flow_info.length_since_last_small_pkt = 0;
                flow_info.ooo_since_last_small_pkt = 0;
                flow_info.last_updated_time = time_now;
                packet action = COPY_TO_SLOW_PATH;
            }
        } else {
            // Let flow_info be the state currently stored for the flow.
            if (small_pkt) {
                // Check this condition to see whether
                // another "strike" should be added against this connection.
                if ((seq != flow_info.exp_seq)
                    || (flow_info.ooo_since_last_small_pkt == 1)
                    || ((seq == flow_info.exp_seq)
                        && (flow_info.length_since_last_small_pkt <=
signature_length))) {
                    if (flow_info.count </count_thresh) {
                        ++flow_info.count;
                    }
                }
                flow_info.length_since_last_small_pkt = 0;
                flow_info.ooo_since_last_small_pkt = 0;
            } elseif (tcp_payload_len != 0) {
                // A large packet
                if (seq != flow_info.exp_seq) {
                    flow_info.ooo_since_last_small_pkt = 1;
                }
                flow_info.length_since_last_small_pkt += tcp_payload_len;
            }
            if (flow_info.count == count_thresh) {
                // Once a connection has reached the limit on
                // "strikes", all of its packets are redirected to the
                // slow path.
                packet_action = REDIRECT_TO_SLOW_PATH;
            } elsif (small_pkt) {
                packet_action = COPY_TO_SLOW_PATH;
            }
            if (tcp_payload_len == 0) {
                // When an ACK packet with no data is detected, the state
                // is not updated.
            } else {
                flow_info.exp_seq = seq + tcp_payload_len
            }
            flow_info.last_updated_time = time_now;
        }
    }
    return (packet_action);
}
```

In an example embodiment, the host computer system that is being protected by a split-detect system, may be modified as follows.

In one example embodiment, a small "all or nothing" modification may be made to the TCP stack of the host computer system. In the pseudocode below, the "expected seq num" value is the sequence number of the first data byte that has not been cumulatively acknowledged by the receiver. It may be assumed that all other sanity checks (e.g., TCP checksum has been verified as being correct) have been performed with respect to the packet.

```
if (packet's seq number is greater than the expected seq num) {
    // case A - "future" data
    store the packet if there is enough space,
    for possible future processing, otherwise drop it
} else if (packet's seq number is equal to the cumulative ack) {
    // case B - all new data next in sequence
    if there is room, append the packet's data
    to the connection's socket buffer.
    Also check any stored packets to see if any now have data that
    immediately follows the one just received in the sequence number
    space, and if so, do the same for them.
} else if (packet's seq number is less than the expected seq num) {
    // case C - at least some old data, perhaps with some new data
    discard it, keeping none of the data
}
```

In this example embodiment, a change to the TCP stack may be performed to verify that, for each TCP segment, either all of the data associated with the TCP segment is used by the receiving application, or none of the data associated with the TCP segment is used by the receiving application. Consequently, every individual packet seen by the split-detect system may be treated as an "atomic transaction."

In another example embodiment, a network normalizer or a TCP proxy may be provided between an attacker and the split-detect system. Consequently, any retransmitted TCP data may remain consistent.

Figure 5:
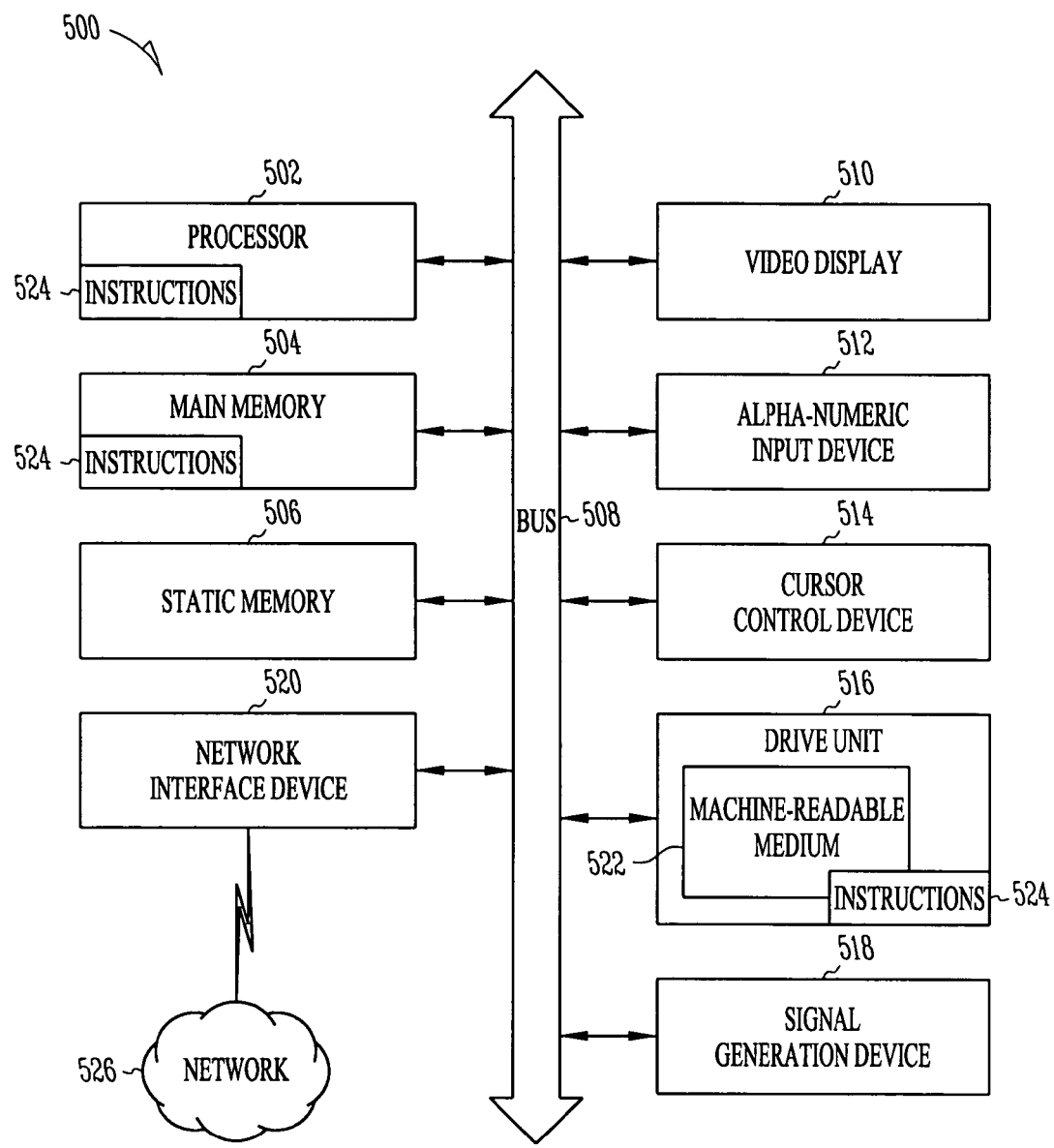
FIG. 5 is a diagrammatic representation of an example machine in the form of a computer system within which a set of instructions, for causing the machine to perform any one or more of the methodologies discussed herein, may be executed.

FIG. 5 shows a diagrammatic representation of a machine in the example form of a computer system 500 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as a "Moving Picture Experts (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alpha-numeric input device 512 (e.g., a keyboard), a user interface (UI) navigation device 514 (e.g., a cursor control device), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of embodiments of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A system comprising:
a repository to store a plurality of signature fragments that together constitute an attack signature;
an interceptor to intercept data packets associated with a network connection;
a detector to detect that a size of a data packet from the data packets is less than a size threshold, the detection that the size of the data packet is less than the size threshold indicating that the data packet cannot include at least one of the plurality of signature fragments; and
a state machine to:
commence maintaining a state for the network connection in response to the detector detecting that the size of the data packet is less than the size threshold, and
based on the state of the network connection, causing a reassembler to reassemble one or more of the intercepted data packets to identify a match between the reassembled data packets and a signature fragment from the plurality of signature fragments, wherein the match may cause a responder to perform a prevention action.

2. The system of claim 1, wherein the prevention action comprises dropping the data packet.

3. The system of claim 1, wherein the prevention action comprises dropping the network connection.

4. The system of claim 1, wherein the state machine comprises a counter to update a count of detected anomalies with respect to data packets intercepted by the interceptor.

5. The system of claim 4, wherein an anomaly from the detected anomalies is associated with a sequence length between small data packets from the data packets intercepted by the interceptor, wherein a size for each of the small data packets is less than the size threshold.

6. The system of claim 4, wherein an anomaly from the detected anomalies is associated with a data packet from the data packets intercepted by the interceptor, the data packet having an out-of-order sequence number.

7. The system of claim 4, further comprising a responder to redirect data packets intercepted by the interceptor to the reassembler in response to the count of detected anomalies reaching a count threshold.

8. The system of claim 1, wherein the network connection is a TCP connection and the data packet is a TCP data packet.

9. A non-transitory machine-readable storage medium having stored thereon data representing sets of instructions which, when executed by a machine, cause the machine to:
store a plurality of signature fragments that together constitute an attack signature;
intercept a data packet associated with a network connection;
detect that a size of the data packet is less than a size threshold, the detection that the size of the data packet is less than the size threshold indicating that the data packet cannot include at least one of the plurality of signature fragments;
commence maintaining a state for the network connection in response to the detector detecting that the size of the data packet is less than the size threshold; and
based on the state of the network connection, causing one or more of the intercepted data packets to be reassembled to identify a match between the reassembled data packets and a signature fragment from the plurality of signature fragments, wherein the match may cause a responder to perform a prevention action.

10. The system machine-readable medium of claim 9, wherein the maintaining of the state for the network connection comprises updating a count of detected anomalies with respect to data packets associated with the network connection.

11. A method comprising:
storing a plurality of signature fragments that together constitute an attack signature;
intercepting data packets associated with a network connection;

detecting, using at least one processor, that a size of a data packet from the data packets is less than a size threshold, the detection that the size of the data packet is less than the size threshold indicating that the data packet cannot include at least one of the plurality of signature fragments;

commencing maintaining a state for the network connection in response to the detector detecting that the size of the data packet is less than the size threshold;

based on the state of the network connection, causing one or more of the intercepted data packets to be reassembled to identify a match between the reassembled data packets and a signature fragment from the plurality of signature fragments, wherein the match may cause a responder to perform a prevention action.

12. The method of claim 11, wherein the prevention action comprises dropping the data packet.

13. The method of claim 11, wherein the prevention action comprises dropping the network connection.

14. The method of claim 11, further comprising updating a count of detected anomalies with respect to the intercepted data packets.

15. The method of claim 14, wherein an anomaly from the detected anomalies is associated with a sequence length between small data packets from the intercepted data packets, wherein a size for each of the small data packets is less than the size threshold.

16. The method of claim 14, wherein an anomaly from the detected anomalies is associated with a data packet from the intercepted data packets, the data packet having an out-of-order sequence number.

17. The method of claim 14, further comprising redirecting intercepted data packets to be reassembled in response to the count of detected anomalies reaching a count threshold.

18. The method of claim 11, wherein the network connection is a TCP connection and the data packet is a TCP data packet.

* * * * *